Dec. 18, 1956  T. D. JOHNSON ET AL  2,774,928
LEAD NETWORK FOR SERVO-MECHANISMS WITH A. C. CARRIER VOLTAGE
Filed Aug. 26, 1952
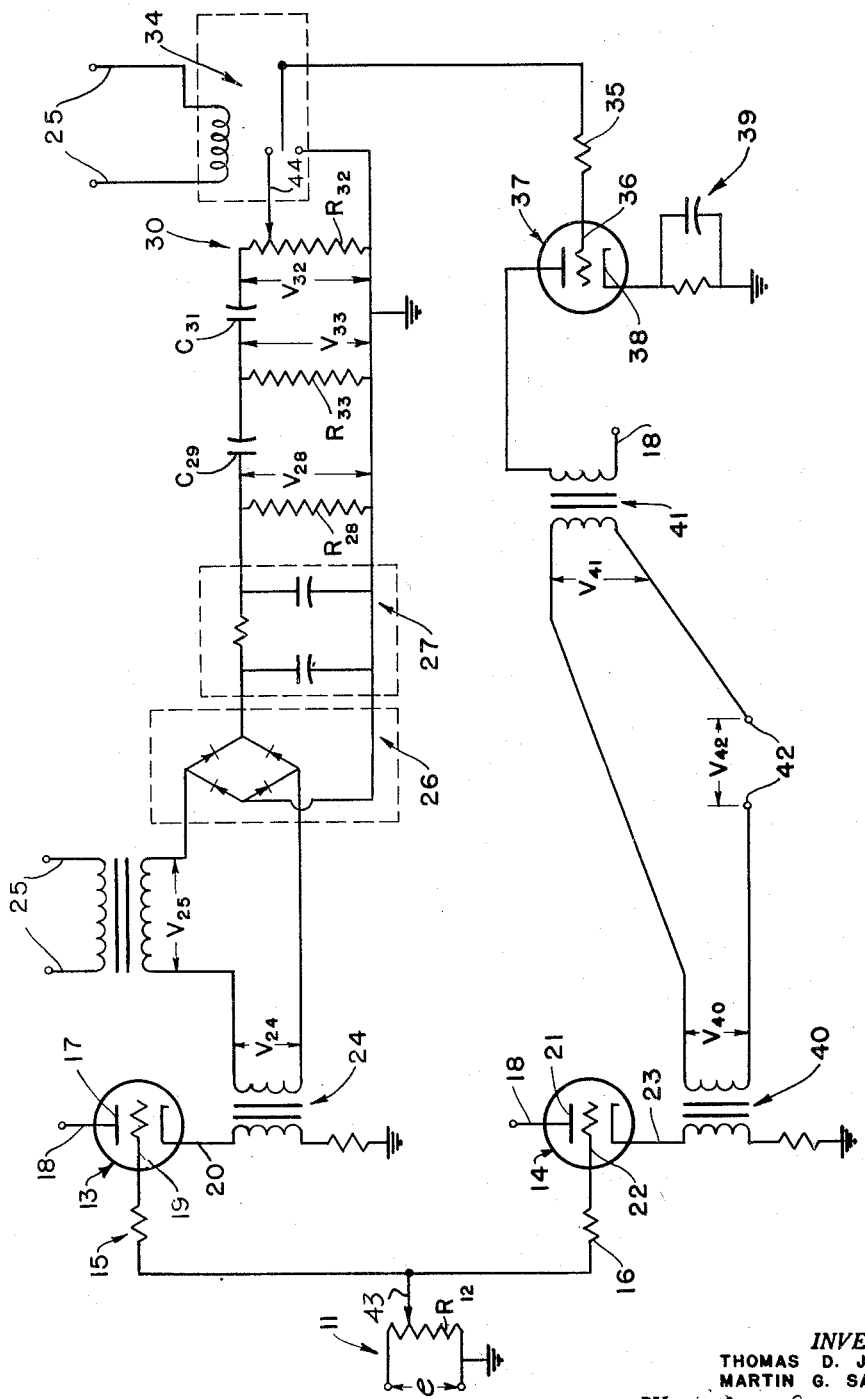
INVENTORS
THOMAS D. JOHNSON
MARTIN G. SATEREN
BY
ATTORNEYS

United States Patent Office 2,774,928
Patented Dec. 18, 1956

2,774,928

LEAD NETWORK FOR SERVO-MECHANISMS WITH A. C. CARRIER VOLTAGE

Thomas D. Johnson, Euclid, Ohio, and Martin G. Sateren, Farrel, Pa., assignors, by mesne assignments, to the United States of America as represented by the Secretary of the Navy Application August 26, 1952, Serial No. 306,404

2 Claims. (Cl. 318—448)

The present invention relates to an electronic circuit for servomechanisms and more particularly to an electronic system for obtaining lead control in an A. C. carrier servomechanism for controlling a torpedo or like vehicle.

Previous control systems have been objectionable because they are comparatively more complicated thereby requiring more components and because they are relatively less reliable. Many others of the circuits heretofore proposed have been relatively unstable or difficult to manufacture with the desired overall characteristics.

An object, therefore, of the present invention is to provide an improved lead control circuit capable of maintaining accurate control over an unusually wide range of errors.

Another object is to provide an improved lead control circuit that is easily manufactured and stable in operation.

A further object is to provide an improved lead control circuit in which voltage drift cannot impose inaccuracies upon the lead-modified error voltage.

Still another object of the present invention is to provide a servomechanism lead network yielding a lead-modified error voltage having an error-rate component adjustable in magnitude relative to the error voltage.

Other objects and many of the attendant advantages of this invention will be readily appreciated as the same becomes better understood by reference to the following detailed description when considered in connection with the accompanying drawing wherein the single figure is a wiring diagram illustrating an embodiment of the novel lead control system of this invention.

Referring now to the drawing wherein like reference characters designate like or corresponding parts, there is shown the circuit diagram of the lead network, including an input circuit 11 comprising a voltage-reducing potentiometer $R_{12}$ to which an error voltage $e$ is supplied, the voltage at the potentiometer arm feeding into cathode followers 13 and 14 through resistors 15 and 16, respectively. Tube 13 comprises plate 17 (energized by plate supply voltage via lead 18); grid 19, and cathode 20. Tube 14 comprises plate 21 (also energized by plate supply voltage via lead 18) grid 22, and cathode 23, and a cathode load circuit 40 across which appears voltage $V_{40}$. Across cathode load 24 of tube 13, voltage $V_{24}$ is developed, to which is added reference voltage $V_{25}$ from reference voltage source 25. Rectifier 26 rectifies the resultant voltage which is smoothed by filter 27 and applied across resistor $R_{28}$ as a varying D. C. voltage. Blocking condenser $C_{29}$ passes only the variable component of the D. C. voltage to the differentiating network 30, which comprises condenser $C_{31}$ and potentiometer $R_{32}$. A voltage $V_{33}$ at error frequency and proportional to the error magnitude appears across potentiometer $R_{33}$. The D. C.–A. C. chopper 34 modulates the differentiated voltage appearing at the arm of potentiometer $R_{32}$, and feeds it through resistor 35 to the grid 36 of amplifier 37 which includes cathode 38 and its cathode circuit 39.

The amplified voltage output $V_{41}$ is developed across plate load 41. Voltage $V_{40}$ is added to voltage $V_{41}$ to obtain a lead-modified voltage $V_{42}$ at output terminals 42.

With the foregoing in mind and referring to the accompanying figure the theory of operation of the device is as follows:

In this electronic circuit for obtaining lead control in A. C. carrier servo-mechanism, the input error voltage $e$ is an A. C. voltage whose magnitude is proportional to a servomechanism error, and whose phase (either in-phase or out-of-phase) with respect to reference voltage $V_{25}$ indicates the direction of the error. Error voltages $e$ from a servomechanism (not shown) is applied across resistor $R_{12}$.

Corresponding to a servomechanism error in one direction, the error voltage $e$ will have a phase angle of 0° with respect to the reference voltage $V_{25}$. If the servomechanism has an error in the opposite direction, the error voltage $e$ will have a phase angle of 180° with respect to reference voltage $V_{25}$.

A portion of the error voltage $e$ depending upon the position of slider 43, is applied to two cathode followers 13 and 14. The output voltage $V_{24}$ of cathode follower 13 is added vectorially to the reference voltage $V_{25}$ and the sum or difference of these two voltages is rectified by rectifier 26, smoothed by filter 27, and appears across resistor $R_{28}$ as D. C. voltage $V_{28}$, variable in accordance with variations in the error voltage $e$. The magnitude of the D. C. voltage $V_{28}$ across resistor $R_{28}$ depends upon the magnitude and phase of the input error voltage $e$; such that, if $e$ is a decreasing 0° phase voltage or an increasing 180° phase voltage, then voltage $V_{28}$ will decrease. If $e$ is an increasing 0° phase voltage or a decreasing 180° phase voltage, voltage $V_{28}$ will increase. Reference voltage $V_{25}$ must be larger than the largest voltage $V_{24}$, developed across cathode load $V_{24}$, so that the voltage $V_{28}$ is a function of the phase and magnitude of error voltage $e$.

A portion of input error voltage $e$ is applied to the grid 22 of cathode follower tube 14. Voltage $V_{40}$, which is an image of error voltage $e$, but of reduced amplitude, is developed across cathode load 40. A portion of input error voltage $e$ is also applied to grid 19 of cathode follower tube 13. Voltage $V_{24}$ is likewise an image of error voltage $e$, but of reduced amplitude and is developed across cathode load 24. Voltage $V_{24}$ is then added to reference voltage $V_{25}$. The vectorial sum of these two voltages is rectified by rectifier 26 smoothed by filter 27, and appears as a varying D. C. voltage $V_{28}$ across resistor $R_{28}$.

Condenser $C_{29}$ is provided in the circuit to pass only the variable component of voltage $V_{28}$, and to block D. C. voltage from condenser $C_{31}$, thereby preventing leakage current in condenser $C_{31}$ from causing an undesired voltage across $R_{32}$. Condenser $C_{29}$ is large enough so that it does not appreciably attenuate the voltages at error frequency. Resistor $R_{33}$ develops a voltage $V_{33}$ which is substantially similar to the variable component of voltage $V_{28}$.

Voltage $V_{33}$ is then applied to the differentiating circuit $C_{31}$, $R_{32}$, which develops a voltage output $V_{32}$ at $R_{32}$, that is proportional to the time rate of change of the applied voltage $V_{33}$. The relationship can be represented by the expression:

Voltage ($V_{32}$) developed across the resistor $= RC\dfrac{dE}{dt}$ in which:
$R$ = the value of the resistance ($R_{32}$)
$C$ = the value of the capacitance ($C_{31}$)
$E$ = the applied voltage ($V_{33}$)

The operation of differentiating circuits is examined further on page 599 of "Radio Engineering" by F. E. Terman, McGraw-Hill Book Company, Third Edition.

A portion of $V_{32}$, depending upon the position of slider 44, is then modulated by D. C.–A. C. chopper 34 at a frequency equal to that of reference voltage source 25, thus at the carrier frequency of the error voltage and either in phase or in phase opposition with voltages $V_{24}$ and $V_{40}$. Amplified chopper voltage $V_{41}$ is added to voltage $V_{40}$ so that the resultant voltage $V_{42}$ anticipates or leads the error voltage $e$. The components of lead-modified voltage $V_{42}$ can be varied by changing the point of contact between slider 44 and resistor $R_{32}$, and by changing the point of contact between slider 43 and resistor $R_{12}$.

Obviously many modifications and variations of the present invention are possible in the light of the above teachings. It is therefore to be understood that within the scope of the appended claims the invention may be practiced otherwise than as specifically described.

What is claimed is:

1. A lead network for a servo system having displacement-error detecting means which is energized at predetermined carrier frequency and which operates to provide an error voltage, said error voltage being suppressed carrier modulated at displacement-error frequency and in accordance with the sense and magnitude of the displacement-error, said lead network comprising first and second cathode follower circuits, means for applying the error voltage to said cathode follower circuits, said cathode follower circuits operating as buffer means and respectively providing first and second voltages corresponding to said error voltage, means providing a reference voltage at said carrier frequency and of preselected magnitude exceeding the magnitudes of said first voltage, means for adding said reference voltage to the first voltage to produce a sum voltage, means for rectifying and filtering said sum voltage to produce a unipolar voltage having an amplitude modulation component corresponding to the displacement error, means for isolating the modulation component of said unipolar voltage, means for deriving from said modulation component a voltage corresponding to the first time-derivative of the displacement-error, a D. C.–A. C. chopper circuit, including buffer means having high input impedance, for converting the first time-derivative voltage to a third voltage having said carrier frequency and suppressed carrier modulated in accordance with said first time-derivative voltage, and means for adding said third voltage to said second voltage to produce a lead-modified error voltage.

2. A lead network for a servo system having displacement-error detecting means which is energized at predetermined carrier frequency and which operates to provide an error voltage, said error voltage being suppressed carrier modulated at displacement-error frequency and in accordance with the sense and magnitude of the displacement-error, said lead network comprising a first potentiometer having a slider and adapted to have applied thereacross said error voltage, first and second cathode follower circuits, said cathode followers adapted to have a portion of the error voltage, depending upon the position of said slider, applied thereto and to produce first and second output voltages, respectively, means providing a reference voltage at said carrier frequency and of preselected magnitude exceeding the magnitudes of said first voltage, means for adding said reference voltage to said first output voltage to produce a sum voltage, means for rectifying and filtering said sum voltage to produce a unipolar voltage having an amplitude modulation component corresponding to the displacement-error, means for isolating the modulation component of said unipolar voltage, a differentiating circuit comprising a condenser and a second potentiometer having a slider and adapted to derive from said modulation component a voltage corresponding to the first time-derivative of said displacement-error, a D. C.–A. C. chopper circuit, including cathode follower means having high input impedance, adapted to convert a portion of said first time-derivative voltage, depending upon the position of the slider of said second potentiometer, to a third voltage having said carrier frequency and suppressed carrier modulated in accordance with said first time-derivative voltage, and means for summing said second and third voltages to produce a lead-modified error voltage.

References Cited in the file of this patent

UNITED STATES PATENTS

| | | |
|---|---|---|
| 2,088,654 | Hull | Aug. 3, 1937 |
| 2,233,415 | Hull | Mar. 4, 1941 |
| 2,409,970 | Agins | Oct. 22, 1946 |
| 2,445,773 | Frost | July 27, 1948 |
| 2,446,567 | White et al. | Aug. 10, 1948 |
| 2,546,837 | Stribling | Mar. 27, 1951 |
| 2,584,954 | Williams | Feb. 5, 1952 |
| 2,632,872 | Warsher | Mar. 24, 1953 |